Patented Jan. 12, 1926.

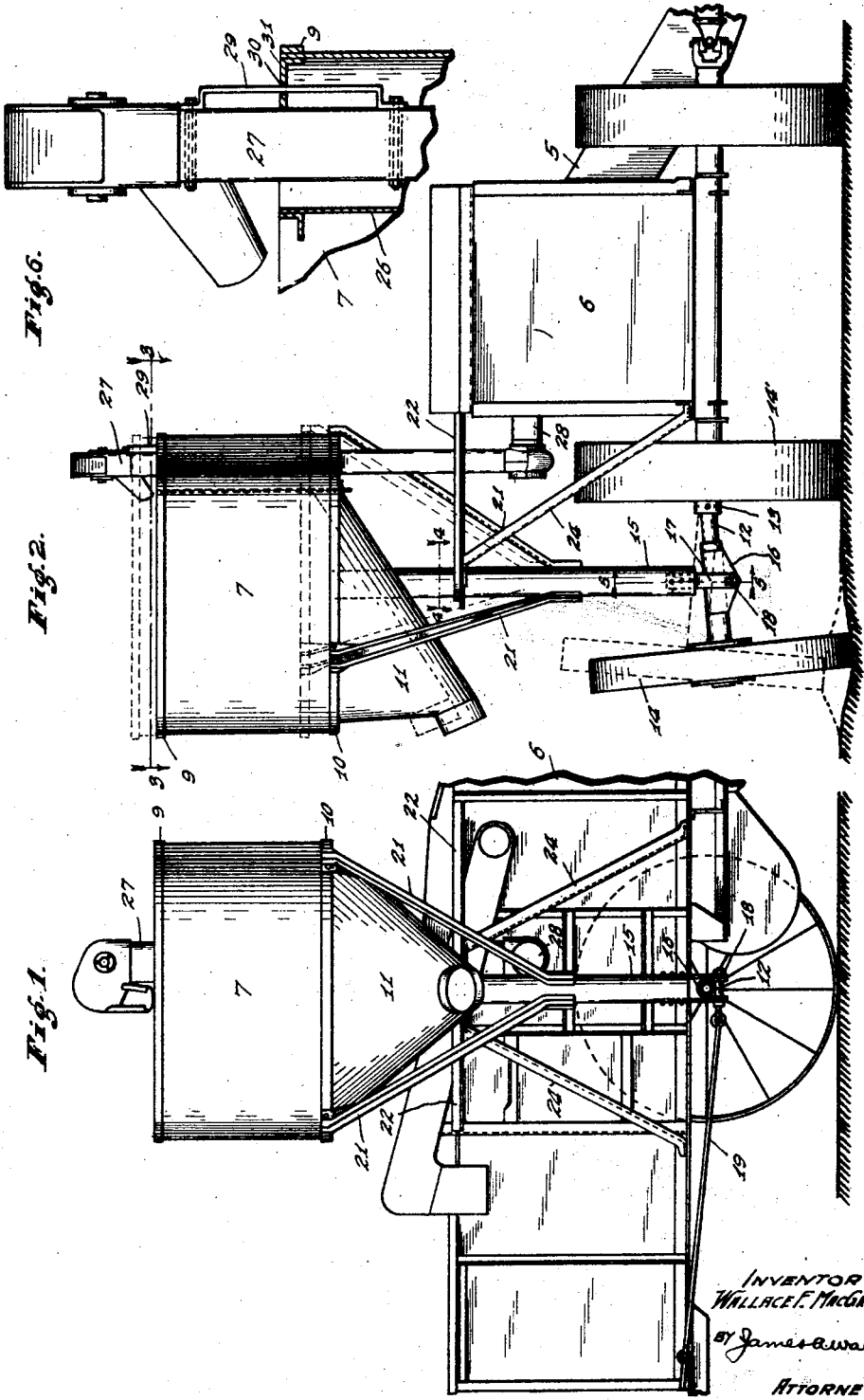

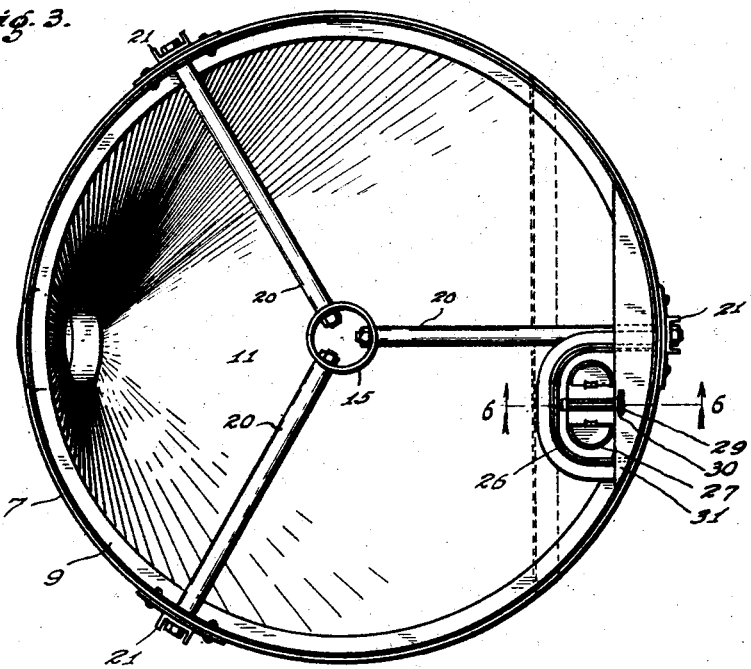
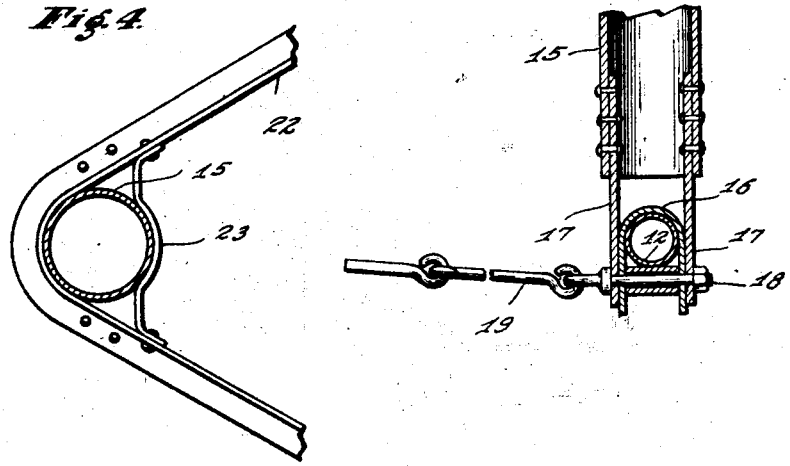

1,569,432

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION OF WISCONSIN.

COMBINATION HARVESTER THRASHER.

Application filed September 12, 1924. Serial No. 737,421.

*To all whom it may concern:*

Be it known that I, WALLACE F. MAC-GREGOR, a citizen of the United States, residing at Racine, in the county of Racine and State of Wisconsin, have invented certain new and useful Improvements in Combination Harvester Thrashers, of which the following is a specification.

In the operation of a combination harvester-thrasher the machinery is caused to travel through the field in a comparatively rapid manner, cutting and thrashing grain as it proceeds, and as it is of utmost importance to continue the machinery in traveling operation it becomes necessary to convey the grain from the thrasher as it discharges therefrom. To accomplish this with teams or motor vehicles, which is common, requires a considerable number which must be constantly moving to the thrasher to receive a load and then haul the same to a granary or grain elevator, often located a considerable distance from field operations. It is my object to provide means attachable in relation to the thrasher to receive grain therefrom as it is being discharged and in sufficient quantities to quickly load the hauling vehicle which is traveling alongside to receive its load. This means I provide in the form of a bin supported independently of the thrasher body and so flexibly connected in relation thereto that no strain will occur, which otherwise would be detrimental when it is considered that such massive machinery is subjected to rough travel in field use. In discharging grain from the thrasher into the bin while the machinery is moving considerable time is required for filling the same so that in practice I have demonstrated that a single motor truck is sufficient for conveying grain from the bin to its place of deposit and returning to be re-filled without cessation of the traveling machinery.

In the accompanying drawings, forming part hereof, Figure 1 is a side elevation of my improvement; Fig. 2 a rear elevation of a harvester-thrasher showing the manner of mounting my improvement in relation thereto; Fig. 3 a plan looking in the direction of the arrows 3—3 in Fig. 2; Fig. 4 a detail section on dotted line 4—4 in Fig. 2; Fig. 5 an enlarged detail on the dotted line 5—5 in Fig. 2, and Fig. 6 a detail on dotted line 6—6 in Fig. 3 showing a manner of stabilizing an elevator operating in connection with my improvement.

In said drawings, the portions marked 5, 6, indicate a combination harvester-thrasher with the thrasher section of which I associate a bin, 7. Said bin 7 may be composed of a sheet metal drum reinforced by angle iron rings, 9, and 10, or of any desired shape or construction, the lower end of the bin being provided with a spouted hopper, 11, for conveying grain therefrom. As a bin for the purpose, especially when loaded with small grain is extremely heavy, it is important that it should be so mounted as not to strain the thrasher 6. I provide a support, such as a stub-axle, 12, which is hingedly connected to axle, 13, of the thrasher, and at its free end is supported by a ground wheel, 14, which with wheel, 14', of the thrasher, assist in transporting said bin, and stub-axle 12 being flexible permits self-adjustment of wheel 14 to ground irregularities. To said stub-axle I secure a mast, 15, preferably in the form of a pipe, pivotally mounting the same to saddle, 16, by means of legs, 17, said legs and saddle being connected by a bolt, 18, which constitutes a pivot for mast 15, and also a retainer for trail rod, 19, which latter is connected at its forward end to the thrasher and maintains stub-axle 12 and wheel 14 in proper position while the machinery is moving. At the top of mast 15 I provide radial arms, 20, secured to ring 10, which support bin 7, and to said arms I secure braces, 21, which extend downwardly and are affixed to said mast. In order to maintain said bin in flexible relation to the thrasher I secure to the latter a brace, 22, which extends outwardly around mast 15 and is provided with a connecting member, 23, so that the assemblage is in effect a ring through which the mast is permitted to move in vertical direction, and I further secure said brace 22 to the thrashed by the downwardly inclined braces, 24.

In said bin 7 I place a partition wall, 26, extending through its length, and thus provide a housing in which an elevator, 27, is positioned, its lower end being connected to the auger spout, 28, of the thrasher, by which arrangement grain is conveyed from the thrasher and discharged into bin 7. The upper end of said elevator is maintained in position by a guide, 29, passing through slot, 30, in holder, 31, or as will be understood, any suitable means may be provided for maintaining said elevator in stable position.

It will thus be seen that the manner of flexibly supporting a bin upon a stub-axle braced to permit its movement in vertical direction maintains the bin and associated parts in stable position without imparting strain to the thrasher body. By extending the elevator 27 through the bin 7 and supporting mast 15 in substantially the manner indicated permits said bin to ascend and descend by the action of the mast and stub-axle as the machinery travels over irregular ground conditions, and at the same time, the relation of the thrasher and the bin to the grain elevator is maintained as the latter moves through the bin only in a vertical direction caused by the movement of the thrasher, and, as explained, said elevator is maintained steadily in its position, and prevented from lateral movement by the means described. While I have shown and described a mast for supporting the bin upon the stub-axle I do not desire to be understood as being limited to such precise arrangement, as, according to the capacity of the bins, I may find it sufficient to support those of smaller type by laterally extending flexible links in connection with upright or inclined supports sustained by a suitable base, as the flexible stub-axle and its ground wheel, or the equivalent thereof, my object broadly being to provide a grain receptacle flexibly associated with a thrasher in such manner that either will move independently of the other, said receptacle being so mounted in relation to the thrasher as to travel therewith without straining the latter or interfering with its independent vertical movement or vibration.

I claim as my invention:

1. The combination, with the frame of a thrashing machine, of a bin adjacent thereto, means connected to said frame for supporting said bin, a prop connected to said supporting means and to said bin for supporting the latter, and means connecting said prop with said frame to permit the independent vertical movement of the latter.

2. The combination, with the frame of a thrashing machine of a stub-axle, supporting means mounted thereon, a bin mounted on said supporting means, and means connecting said supporting means and thrasher frame to permit vertical adjustment of said bin.

3. The combination, with the frame of a thrashing machine, of a stub-axle extending therefrom, a ground wheel supporting the free end thereof, supporting means mounted on said stub-axle, a bin mounted on said supporting means, and a brace connected to said thrasher frame for sustaining said supporting means.

4. The combination, with the frame of a thrasher, of a bin, a mast supporting said bin, a stub-axle upon which said mast is mounted, wheels supporting said stub-axle, and means for connecting said mast to said thrasher.

5. The combination, with the frame of a thrasher having an elevator, of a storage bin encasing said elevator to permit vertical movement of said elements independently of each other.

6. The combination, with the frame of a thrasher having an elevator, of a storage bin encasing said elevator to permit vertical movement of said elements, and means in said bin to prevent lateral movement of said elevator.

7. The combination, with a thrashing machine frame, of a storage bin having an outlet therein, an open-ended elevator housing in said bin, and yielding means connected to said frame for supporting said bin.

8. A thrasher frame having a stub-axle, a ground wheel thereon, a bin, means for supporting said bin, pivotal means connecting said supporting means and said axle, and means connecting said stub-axle to said thrasher frame for maintaining said ground wheel in traveling relation to said frame.

9. A thrasher frame having carrying wheels, a ground wheel adjacent to one of said carrying wheels, means connecting a carrying wheel to said ground wheel, and a bin mounted upon said connecting means.

10. A thrasher frame having a brace extending laterally therefrom, a support extending through and adapted to move vertically in said brace, a storage bin mounted upon said support, and means at the lower end of said support for sustaining the same.

11. The combination, with the frame of a thrasher, of a bin, a support upon which said bin is mounted, a stub-axle, a leg pivotally connecting said support and axle, and means for sustaining said support against lateral movement.

12. The combination, with the frame of a thrasher, of an elevator, a storage bin through which said elevator passes, a mast supporting said bin, and means supported by said frame upon which said mast is mounted to permit its vertical movement in relation to said frame.

13. The combination, with a thrasher frame, of a bin, a mast supporting the same, a stub-axle connected to said frame, a wheel at the outer end thereof, means for connecting said mast and stub-axle, and means connecting said frame and said axle for maintaining said wheel in traveling relation to said frame.

14. The combination, with the frame of a thrasher, of an elevator, a bin adjacent said thrasher frame embodying a guide for said elevator to permit its vertical movement in relation to said bin, and means for connecting said bin to said frame.

In testimony whereof I affix my signature.

WALLACE F. MacGREGOR.